United States Patent [19]

Yamamoto et al.

[11] Patent Number: 4,933,385
[45] Date of Patent: Jun. 12, 1990

[54] RUBBER COMPOSITION

[75] Inventors: Hisao Yamamoto; Michio Itoh; Yoichi Watanabe; Yutaka Iseda, all of Tokyo, Japan

[73] Assignee: Bridgestone Corporation, Tokyo, Japan

[21] Appl. No.: 266,962

[22] Filed: Nov. 2, 1988

[30] Foreign Application Priority Data

Nov. 2, 1987 [JP] Japan ................. 62-275832

[51] Int. Cl.$^5$ ............ C08K 5/34; C08K 5/15; B60C 9/02
[52] U.S. Cl. .................. 524/105; 524/398; 152/548
[58] Field of Search ............ 524/105, 108, 398; 152/548

[56] References Cited

FOREIGN PATENT DOCUMENTS

| | | |
|---|---|---|
| 52-26276 | 7/1977 | Japan . |
| 54-47778 | 4/1979 | Japan . |
| 54-52188 | 4/1979 | Japan . |
| 54-31511 | 10/1979 | Japan . |
| 56-19820 | 5/1981 | Japan . |
| 56-39828 | 9/1981 | Japan . |
| 57-138931 | 8/1982 | Japan . |
| 58-89631 | 5/1983 | Japan . |
| 61-14238 | 1/1986 | Japan . |
| 61-51041 | 3/1986 | Japan . |
| 61-166844 | 7/1986 | Japan . |
| 61-238501 | 10/1986 | Japan . |
| 62-7739 | 1/1987 | Japan . |
| 972804 | 10/1964 | United Kingdom . |

Primary Examiner—Lewis T. Jacobs
Attorney, Agent, or Firm—Sughrue, Mion, Zinn, Macpeak & Seas

[57] ABSTRACT

A rubber composition having excellent adhesion to steel cords comprising:
(a) 100 parts by weight of at least one rubber selected from the group consisting of natural rubber, synthetic rubber and a blend thereof;
(b) from about 0.01 to 1 part by weight of elemental cobalt contained in at least one cobalt oxyketone complex represented by formulae (I) or (II):

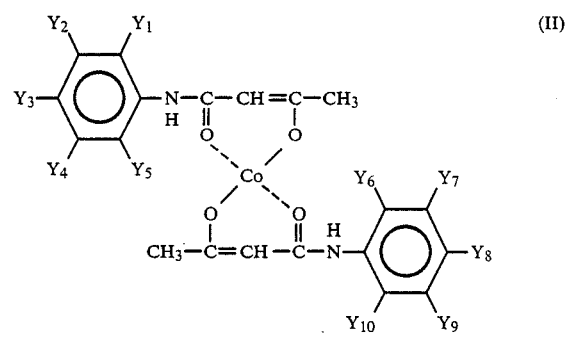

and

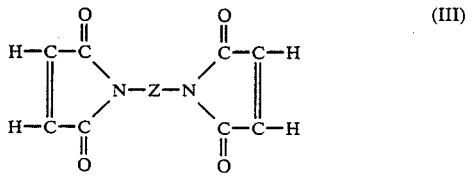

wherein $X_1$–$X_4$ and $Y_1$–$Y_{10}$ are as defined in the specification; and
(c) from about 0.2 to 10 parts by weight of a bismaleimide compound represented by formula (III):

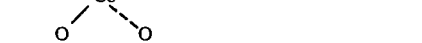

wherein Z represents a hydrocarbon group containing 2 to 10 carbon atoms. The rubber composition has excellent adhesion to steel cord, excellent thermoresistability, and is suitable for use in tire, belt, hose and vibration insulating rubber.

17 Claims, No Drawings

RUBBER COMPOSITION

FIELD OF THE INVENTION

The present invention relates to rubber compositions suitable for rubber goods such as tire, belt, hose and vibration insulating rubber, particularly, to rubber compositions having good adhesive properties with steel cord for reinforcing the rubber, good thermoresistant properties and good thermoresistibility under high humidity, and more particularly, to rubber compositions suitable for adhering to metal which exhibit excellent thermoresistant properties and durability under heat and humidity especially when used as a steel cord coating rubber.

BACKGROUND OF THE INVENTION

Recently, remarkable developments have been attained in "steel tires" in which steel cords are used for belts or carcass plies, while diversified studies have been made of adhesion between steel cord and rubber.

In general, methods for bonding a steel cord with a rubber can be roughly classified into two groups: one known as an RHS bonding system which utilizes resorcinol/hexamethylenetetramine/silica, and another one wherein metal salts, particularly, cobalt salts of organic acid are compounded with the rubber. The latter has been widely utilized and rubber compositions compounded with metal salts have been proposed as a steel cord coating rubber. For example, in Japanese Patent Application Publication No. 56-39,828, Japanese Patent Application (OPI) No. 54-52,188, Japanese Patent Application Publication No. 52-26,276, Japanese Patent Application Publication No. 54-31,511 and Japanese Patent Application (OPI) No. 58-89,631, there are disclosed rubber compositions in which cobalt naphthenate, cobalt stearate, cobalt oleate, cobalt tallate, cobalt resinate or the like is compounded as an adhesion promoter. (The term "OPI" refers to a "published unexamined Japanese patent application".)

Further, Japanese Patent Application Publication No. 56-19,820 discloses a rubber composition compounded with cobalt acetonate.

Furthermore, it has been proposed to improve the rubber properties by compounding bismaleimide. For example, in Japanese Patent Application (OPI) No. 61-238,501, there is disclosed a rubber composition having improved blow out properties under heating, wear resistant properties and gripping properties wherein 0.1 to 1.5 parts by weight of bismaleimide and 0.3 to 3 parts by weight of vulcanization accelerator are compounded per 100 parts by weight of rubber, and the weight ratio of sulfur and vulcanization accelerator is specified respectively.

In Japanese Patent Application (OPI) No. 61-14,238, there are disclosed rubber compositions providing a vulcanizate which has high strength without vulcanization reversion under high temperature vulcanization, wherein natural rubber contain bismaleimide, sulfur and at least one compound selected from dibenzothiazyldisulfide and tetraalkylthiuramdisulfide in specified amounts.

In Japanese Patent Application (OPI) No. 61-51,041, there disclosed vulcanized rubber compositions having an increased rate of vulcanization and heat resistant properties, wherein halogenized-butyl rubber contains a p-alkylphenolsulfide resin and bismaleimide and the like.

In Japanese Patent Application (OPI) No. 61-166,844, there are disclosed rubber compositions having improved scorch properties, reversion of vulcanization, heat deterioration resistance and crack resistance under flexing, wherein bismaleimide, sulfenamide, dithiophosphoric acid and sulfur are compounded with natural rubber and/or synthetic rubber.

In Japanese Patent Application (OPI) No. 62-7,739, there is disclosed improved heat resistance by compounding cobalt abietinate and linear alkylene bismaleimide.

Furthermore, British Patent No. 972,804, discloses a rubber compound having relatively good adhesion between rubber and steel wire under heat and humidity, wherein a cobalt complex of an organic acid containing boron (lately known as "Manobond C" (Trade Name) manufactured by Manchem Co.) is compounded.

Recently, demands for safety, high speed traveling properties and durability of automotive tires have been increasing so that the above conventional techniques do not always provide satisfactory adhesion.

Namely, in tires reinforced with steel cord, heat or heat under high humidity generated during running induces a deterioration of bonding force between the steel cord and rubber, causing a total break-down of the tires. According to conventional techniques, satisfactory durability of the tire is not obtainable.

Alternatively, from the standpoint of rationalization and energy saving in manufacturing, rapid vulcanization is important. Therefore, adhesion promoters have become required for promoting adhesion of rubbers to steel cords, not only for thermoresistant adhesion and thermoresistant adhesion under high humidity but also to augment initial bonding strength in a short cure time. However, adhesion promoters to meet these required characteristics have never been proposed. For example, in an RHS bonding system which utilizes resorcinol/hexamethylenetetramine/silica, both the thermoresistant adhesion and the thermoresistant adhesion under high humidity are not satisfactory. In the rubber compound containing a cobalt salt of organic acid or complex of cobalt oxyketone, the thermoresistant adhesion under high humidity is not satisfactory. Further, in the rubber compound containing a cobalt salt of organic acid and linear alkylenebismaleimide, initial bonding strength is not satisfactory and in the rubber compound containing a cobalt complex of organic acid containing boron, the thermoresistant adhesion is not satisfactory.

SUMMARY OF THE INVENTION

One object of the invention is to provide a rubber compound which exhibits great improvements in both thermoresistant adhesion and thermoresistant adhesion under high humidity, in addition to initial adhesion between rubber and steel cord.

We, the inventors, have found that by utilizing the combination of specified cobalt oxyketone complexes and bismaleimide, remarkable improvements can be achieved.

It has now been found that this and other objects of the invention are attained by a rubber composition having excellent adhesion to steel cords containing:

(a) 100 parts by weight of at least one rubber selected from the group consisting of natural rubber, synthetic rubber and a blend thereof;

(b) from about 0.01 to 1 part by weight of elemental cobalt contained in at least one cobalt oxyketone complex selected from the group consisting of compounds represented by formulae (I) and (II):

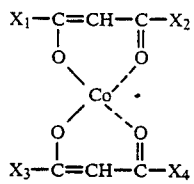

(I)

wherein $X_1$, $X_2$, $X_3$ and $X_4$, which may be the same or different, each represents an alkyl group containing 1 to 18 carbon atoms, a cycloalkyl group containing 5 to 12 carbon atoms, an aryl group containing 6 to 14 carbon atoms, an aryl group containing 6 to 14 carbon atoms substituted with an alkyl group containing 1 to 4 carbon atoms, an alkoxy group containing 1 to 18 carbon atoms, a cycloalkoxy group containing 5 to 12 carbon atoms, an aryloxy group containing 6 to 14 carbon atoms, an aryl group containing 6 to 14 carbon atoms substituted with an alkoxy group containing 1 to 4 carbon atoms, or a hydrocarbon group containing 2 to 18 carbon atoms and having at least one double bond, provided that $X_1$, $X_2$, $X_3$ and $X_4$ contain a total of at least 4 carbon atoms; and

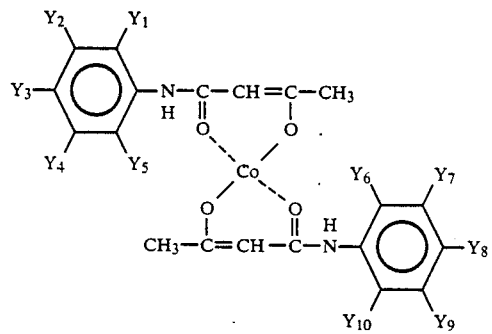

(II)

wherein $Y_1$, $Y_2$, $Y_3$, $Y_4$, $Y_5$, $Y_6$, $Y_7$, $Y_8$, $Y_9$ and $Y_{10}$, which may be the same or different, each represents hydrogen, an alkyl group containing 1 to 18 carbon atoms, a cycloalkyl group containing 5 to 12 carbon atoms, an aryl group containing 6 to 14 carbon atoms, an aryl group containing 6 to 14 carbon atoms substituted with an alkyl group containing 1 to 4 carbon atoms, an alkoxy group containing 1 to 18 carbon atoms, a cycloalkoxy group containing 5 to 12 carbon atoms, an aryloxy group containing 6 to 14 carbon atoms, an aryl group containing 6 to 14 carbon atoms substituted with an alkoxy group containing 1 to 4 carbon atoms, a halogen atom, or a hydrocarbon group containing 2 to 18 carbon atoms and having at least one double bond; and (c) from about 0.2 to 10 parts by weight of a bismaleimide compound represented by formula (III):

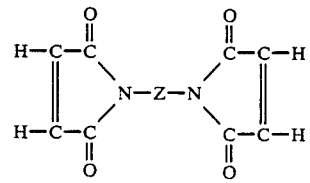

(III)

wherein Z represents a hydrocarbon group containing 2 to 10 carbon atoms.

DETAILED DESCRIPTION OF THE INVENTION

The present invention will be explained in more detail hereinafter.

Rubbers composing the rubber compositions of the present invention are sulphur-vulcanizable, and include natural rubbers, polyisoprene rubbers, polybutadiene rubbers, styrene/butadiene copolymer rubbers, isoprene/isobutylene copolymer rubbers, halogenated isoprene/isobutylene copolymer rubbers, ethylene/propylene/diene terpolymer rubbers (EPDM), butadiene/propylene copolymer rubbers, butadiene/ethylene copolymer rubbers, butadiene/isoprene copolymer rubbers, polypentenamer and the like or blends thereof. The natural rubbers, polyisoprene rubbers, polybutadiene rubbers, styrene/butadiene copolymer rubbers and blends thereof, among others, are preferred, and the natural rubbers, polyisoprene rubbers and blends thereof are particularly preferred because of high versatility.

In the present invention, the cobalt oxyketone complexes to be compounded with such rubbers are represented by the above general formulas (I) and (II).

Specific examples of $X_1$, $X_2$, $X_3$ and $X_4$ in the above formula (I), include methyl, ethyl, propyl, isopropyl, n-butyl, sec-butyl, tert-butyl, n-pentyl, isopentyl, sec-pentyl, neopentyl, n-hexyl, isohexyl, sec-hexyl, cyclohexyl, phenyl, n-heptyl, isoheptyl, methylcyclohexyl, cyclohexylmethyl, benzyl, methylphenyl, n-octyl, 2-ethylhexyl, cyclooctyl, nonyl, decyl, naphthyl, undecyl, naphthylmethyl, dodecyl, tridecyl, tetradecyl, anthracenyl, pentadecyl, hexadecyl, heptadecyl, octadecyl and the like. Among them, methyl, ethyl, tert-butyl, phenyl and n-heptyl are preferred.

Further, specific examples of the substituent groups $Y_1$, $Y_2$, $Y_3$, $Y_4$, $Y_5$, $Y_6$, $Y_7$, $Y_8$, $Y_9$ and $Y_{10}$ in the above formula (II) include hydrogen, methyl, ethyl, propyl, isopropyl, n-butyl, tert-butyl, n-pentyl, isopentyl, sec-pentyl, neopentyl, n-hexyl, isohexyl, sec-hexyl, cyclohexyl, n-heptyl, isoheptyl, tert-heptyl, octyl, 2-ethylhexyl, nonyl, decyl, undecyl, dodecyl, tridecyl, tetradecyl, pentadecyl, hexadecyl, heptadecyl, octadecyl, methylcyclohexyl, cyclohexylmethyl, naphthyl, anthracenyl, naphthylmethyl, cycloheptyl, cyclooctyl, phenyl, benzyl, cyclononyl, cyclodecyl, cycloundecyl, cyclododecyl, 9-octadecenyl, methylphenyl and the like. Among them, hydrogen is preferred.

Furthermore, specific examples of Z in the above formula (III) include phenylene, tolylene, xylene, ethylphenylene, ethylmethylphenylene, isopropylphenylene, isobutylphenylene, isopropylmethylphenylene, diethylphenylene, propylphenylene, butylphenylene, tert-butylphenylene, ethylene, propylene, isopropylene, butylene, isobutylene, amylene, isoamylene, hexamethylene, pentamethylene, octamethylene, nonamethylene, decamethylene and the like. Among them, phenylene, tolylene, ethylene and hexamethylene are preferred.

In the present invention, the cobalt oxyketone complexes are compounded in an amount sufficient to provide about 0.01 to 1 part by weight of elemental cobalt per 100 parts of rubber by weight. If the amount is less than about 0.01 part by weight, sufficient effects can not be obtained, while compounding in excess of about 1 part by weight is not preferred not only for possibly causing deterioration of physical properties of the rubber but also from an economical point of view. In the present invention, the cobalt element content is particularly preferably about 0.05-0.5 part by weight.

Further, bismaleimides are compounded in an amount of about 0.2 to 10 parts by weight per 100 parts of rubber by weight. If the amount is less than about 0.2 part by weight, sufficient effects can not be obtained, while compounding in excess of about 10 parts is not preferred, not only for possibly causing deterioration of physical properties of the rubber but also from the economical point of view. In the present invention, bismaleimide is compounded preferably in an amount of about 0.5 to 5 parts by weight.

Additionally, the rubber compositions of the present invention may contain, according to purposes, various compounding additives in addition to the above-described cobalt oxyketone complexes. As the compounding additives, those conventionally employed in the rubber industry, for example, reinforcements or fillers, such as carbon black, silica, calcium carbonate or the like; softeners such as aromatic oils; vulcanizing accelerators; vulcanizing accelerator aids; age resistant agents; and the like, can be arbitrarily selected, if required, in a range of usual amount of compounding.

Rubber compositions according to the present invention are suitably employed in adhesion particularly to metals, and are preferably used as a coating composition for steel belts, steel breakers, steel carcass plies, wire chafers, wire flippers, bead wires or the like, of tires.

In addition, they are applicable in industrial articles other than tires, for example, steel cord reinforced conveyer belts, steel cord reinforced hoses, rubber vibration isolators, or the like.

The present invention will be explained in more detail hereinafter with reference to specific examples, but the invention is not to be construed as being limited by the following examples. Unless otherwise indicated, all parts, percents and ratios are by weight.

Additionally, in the examples, evaluation methods of initial adhesion, thermoresistant adhesion and thermoresistant adhesion under high humidity, were as follows:

Initial adhesion

A steel cord/rubber composite consisting of unvulcanized rubber embedding a steel cord of 1×5 (structure)×0.23 mm with brass-plated surfaces was vulcanized at 170° C. for 4 minutes. Then, a test of peeling the steel cord off the embedding rubber was conducted in accordance with the JIS ("Japanese Industrial Standard") K 6301, peeling test. The adhesion was evaluated by the amount of rubber remaining on the cord. A condition wherein the cord was completely covered by the rubber was denoted as 100, and a condition wherein no rubber remained as adhered was denoted as 0.

Thermoresistant adhesion

A steel cord/rubber composite similar to that used in the initial adhesion test was left to stand for 9 days in an oven at 120° C. Then, the adhesion was evaluated in the same manner as that for initial adhesion, except that the vulcanization was carried out at 170° C. for 8 minutes.

Thermoresistant adhesion under high humidity

A steel cord/rubber composite similar to that used in thermoresistant adhesion test was left to stand for 7 days in an oven at 80° C. under 80% humidity. Then, the adhesion was evaluated in the same manner as that for the initial adhesion.

EXAMPLES 1-7, and COMPARATIVE EXAMPLE 1-7

Eighty parts by weight of a natural rubber, 20 parts by weight of a synthetic polyisoprene rubber (IR 2200), 50 parts by weight of carbon black, 1 part by weight of N-(1,3-dimethylbutyl)-N'-phenyl-p-phenylenediamine, 2 parts by weight of aromatic oil, 8 parts by weight of zinc oxide, and 0.5 part by weight of benzothiazole sulfeneamide were compounded with 0.2 part by weight as elemental cobalt content of various cobalt compounds shown in Table 1 and the mixture was kneaded in a Banbury mixer to prepare respective rubber compositions.

With respect to the obtained rubber compositions, initial adhesion, thermoresistant adhesion and thermoresistant adhesion under high humidity were evaluated.

Additionally, for comparison, the same evaluation was made. The results are shown in Table 1. The abbreviations in the Table 1 refer to the following compounds.

Nap-Co: Cobalt naphthenate

MC—Co:
B(O—Co—O—C(=O)—R)$_3$ manufactured by Manchem, England

AAc-Co: Cobalt acetylacetonate
3A-Co: Cobalt acetoacetic anilide
C$_7$ diketone-Co: Cobalt heptylacetonate
PBM: phenylenebismaleimide
TBM: tolylenebismaleimide
EBM: ethylenebismaleimide TABLE 1 (a)

|  | Comparative Example | | | | | | |
|---|---|---|---|---|---|---|---|
|  | 1 | 2 | 3 | 4 | 5 | 6 | 7 |
| Cobalt Complex | Nap-Co | MC-Co | AAc-Co | 3A-Co | Nap-Co | MC-Co | Nap-Co |
| Bismaleimide (parts by weight) | — | — | — | — | PBM 2 | PBM 2 | EBM 2 |
| Sulphur (parts by weight) | 5 | 5 | 5 | 5 | 4 | 4 | 4 |
| Initial Adhesion | 50 | 40 | 70 | 75 | 40 | 30 | 40 |
| Thermoresistant Adhesion | 50 | 40 | 90 | 100 | 80 | 70 | 80 |
| Thermoresistant Adhesion under | 10 | 25 | 5 | 10 | 25 | 40 | 25 |

TABLE 1 (a)-continued

| | Comparative Example | | | | | | |
|---|---|---|---|---|---|---|---|
| | 1 | 2 | 3 | 4 | 5 | 6 | 7 |
| high humidity | | | | | | | |

TABLE 1 (b)

| | Example | | | | | | |
|---|---|---|---|---|---|---|---|
| | 1 | 2 | 3 | 4 | 5 | 6 | 7 |
| Cobalt Complex | AAc-Co | AAc-Co | 3A-Co | 3A-Co | $C_7$ diketone -Co | 3A-Co | 3A-Co |
| Bismaleimide (parts by weight) | PBM 2 | TBM 2 | PBM 2 | EBM 2 | PBM 2 | PBM 3 | PBM 1.5 |
| Sulphur (parts by weight) | 4 | 4 | 4 | 4 | 4 | 5 | 5 |
| Initial Adhesion | 70 | 70 | 85 | 80 | 65 | 90 | 90 |
| Thermoresistant Adhesion | 100 | 90 | 100 | 90 | 80 | 90 | 90 |
| Thermoresistant Adhesion under high humidity | 40 | 40 | 45 | 45 | 45 | 40 | 40 |

As is clear from Table 1, the rubber compositions according to the present invention containing the combination of cobalt oxyketone complex and bismaleimide were surprisingly excellent both in thermoresistant adhesion and thermoresistant adhesion under high humidity of rubber to steel cord in addition to excellent initial adhesion.

As explained in detail above, the rubber compositions according to the present invention which comprises a specified cobalt oxyketone complex and bismaleimide compounded with natural rubber and/or synthetic rubber in a specified amount are extremely improved both in thermoresistant adhesion and thermoresistant adhesion under high humidity in addition to remarkably improved initial adhesion of rubber to steel cord.

Accordingly, the rubber compositions of the present invention are very effective for adhering in articles to be exposed to high temperatures and high humidity, and further allow the articles to be produced efficiently by virtue of the excellent initial adhesion.

Such rubber compositions of the present invention are very useful particularly for steel belts and steel carcass plies of a tire, and in addition, useful for industrial articles such as steel reinforced conveyer belts, steel reinforced hoses, vibration insulating rubber and the like.

While the invention has been described in detail and with reference to specific embodiments thereof, it will be apparent to one of ordinary skill in the art that various changes and modifications can be made therein without departing from the spirit and scope thereof.

What is claimed is:

1. A rubber composition having excellent adhesion to steel cords comprising:
   (a) 100 parts by weight of at least one rubber selected from the group consisting of natural rubber, synthetic rubber and a blend thereof;
   (b) from about 0.01 to 1 part by weight of elemental cobalt contained in at least one cobalt oxyketone complex selected from the group consisting of compounds represented by formulae (I) and (II):

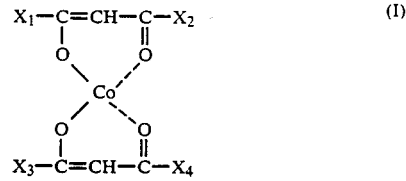

wherein $X_1$, $X_2$, $X_3$ and $X_4$, which may be the same or different, each represents an alkyl group containing 1 to 18 carbon atoms, a cycloalkyl group containing 5 to 12 carbon atoms, an aryl group containing 6 to 14 carbon atoms, an aryl group containing 6 to 14 carbon atoms substituted with an alkyl group containing 1 to 4 carbon atoms, an alkoxy group containing 1 to 18 carbon atoms, a cycloalkoxy group containing 5 to 12 carbon atoms, an aryloxy group containing 6 to 14 carbon atoms, an aryl group containing 6 to 14 carbon atoms substituted with an alkoxy group containing 1 to 4 carbon atoms, or a hydrocarbon group containing 2 to 18 carbon atoms and having at least one double bond, provided that $X_1$, $X_2$, $X_3$ and $X_4$ contain a total of at least 4 carbon atoms; and

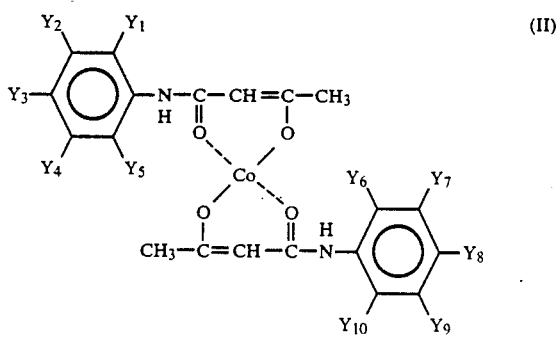

wherein $Y_1$, $Y_2$, $Y_3$, $Y_4$, $Y_5$, $Y_6$, $Y_7$, $Y_8$, $Y_9$ and $Y_{10}$, which may be the same or different, each represents hydrogen, an alkyl group containing 1 to 18 carbon atoms, a cycloalkyl group containing 5 to 12 carbon atoms, an aryl group containing 6 to 14 carbon atoms, an aryl group containing to 14 carbon atoms substituted with an alkyl group containing 1 to 4 carbon atoms, an alkoxy group containing to 18 carbon atoms, a cycloalkoxy group containing 5 to 12 carbon atoms, an aryloxy group containing 6 to 14 carbon atoms, an aryl group containing 6 to 14 carbon atoms substituted with an alkoxy group containing 1 to carbon atoms, a halogen atom, or a hydrocarbon group containing 2 to 18 carbon atoms and having at least one double bond; and (c) from about 0.2 to 10 parts by weight of a bismaleimide compound represented by formula (III):

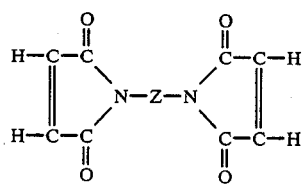

wherein Z represents a hydrocarbon group containing 2 to 10 carbon atoms.

2. The rubber composition as claimed in claim 1, wherein said synthetic rubber is selected from the group consisting of a polyisoprene rubber, a polybutadiene rubber, a styrene/butadiene copolymer rubber, an isoprene/isobutylene copolymer rubber, a halogenated isoprene/isobutylene copolymer rubber, an ethylene/propylene/diene terpolymer rubber, a butadiene/propylene copolymer rubber, a butadiene/ethylene copolymer rubber, a butadiene/isoprene copolymer rubber, a polypentenamer, and a blend thereof.

3. The rubber composition as claimed in claim 1, wherein said rubber is selected from natural rubber, a polyisoprene rubber, a polybutadiene rubber, a styrene/butadiene copolymer rubber, and a blend thereof.

4. The rubber composition as claimed in claim 1, wherein in formula (I) $X_1$, $X_2$, $X_3$ and $X_4$ each represents methyl, ethyl, propyl, isopropyl, n-butyl, sec-butyl, tert-butyl, n-pentyl, isopentyl, sec-pentyl, neopentyl, n-hexyl, isohexyl, sec-hexyl, cyclohexyl, phenyl, n-heptyl, isoheptyl, methylcyclohexyl, cyclohexylmethyl, benzyl, methylphenyl, n-octyl, 2-ethylhexyl, cyclooctyl, nonyl, decyl, naphthyl, undecyl, naphthylmethyl, dodecyl, tridecyl, tetradecyl, anthracenyl, pentadecyl, hexadecyl, heptadecyl or octadecyl; and $Y_1$, $Y_2$, $Y_3$, $Y_4$, $Y_5$, $Y_6$, $Y_7$, $Y_8$, $Y_9$ and $Y_{10}$ in formula (II) each represents hydrogen, methyl, ethyl, propyl, isopropyl, n-butyl, tert-butyl, n-pentyl, isopentyl, sec-pentyl, neopentyl, n-hexyl, isohexyl, sec-hexyl, cyclohexyl, n-heptyl, isoheptyl, tert-heptyl, octyl, 2-ethylhexyl, nonyl, decyl, undecyl, dodecyl, tridecyl, tetradecyl, pentadecyl, hexadecyl, heptadecyl, octadecyl, methylcyclohexyl, cyclohexylmethyl, naphthyl, anthracenyl, naphthylmethyl, cycloheptyl, cyclooctyl, phenyl, benzyl, cyclononyl, cyclodecyl, cycloundecyl, cyclododecyl, 9-octadecenyl or methylphenyl.

5. The rubber composition as claimed in claim 1, wherein Z in formula (III) represents phenylene, tolylene, xylene, ethylphenylene, ethylmethylphenylene, isopropylphenylene, isobutylphenylene, isopropylmethylphenylene, diethylphenylene, propylphenylene, butylphenylene, tert-butylphenylene, ethylene, propylene, isopropylene, butylene, isobutylene, amylene, isoamylene, hexamethylene, pentamethylene, octamethylene, nonamethylene or decamethylene.

6. The rubber composition as claimed in claim 4, wherein $X_1$, $X_2$, $X_3$ and $X_4$ each represents methyl, ethyl tert-butyl, phenyl or n-heptyl.

7. The rubber composition as claimed in claim 4, wherein $Y_1$, $Y_2$, $Y_3$, $Y_4$, $Y_5$, $Y_6$, $Y_7$, $Y_8$, $Y_9$ and $Y_{10}$ each represents hydrogen.

8. The rubber composition as claimed in claim 5, wherein Z represents phenylene, tolylene, ethylene or hexamethylene.

9. The rubber composition as claimed in claim 1, wherein said cobalt oxyketone complex is present in an amount containing from about 0.05 to 0.5 part by weight of elemental cobalt.

10. The rubber composition as claimed in claim 1, wherein said bismaleimide compound is present in an amount of from about 0.5 to 5 parts by weight.

11. The rubber composition as claimed in claim 1, further comprising at least one of (a) a filler selected from carbon black, silica and calcium carbonate; (b) a softener; (c) a vulcanizing accelerator; (d) a vulcanizing accelerator aid; and (e) an age resistant agent.

12. The rubber composition as claimed in claim 1, wherein said cobalt oxyketone complex is represented by formula (I).

13. The rubber composition as claimed in claim 1, wherein said cobalt oxyketone complex is represented by formula (II).

14. The rubber composition as claimed in claim 12, wherein said cobalt oxyketone complex represented by formula (I) is selected from the group consisting of cobalt acetylacetonate, cobalt ethylacetonate, cobalt phenylacetonate and cobalt heptylacetonate.

15. The rubber composition as claimed in claim 13, wherein said cobalt oxyketone complex represented by formula (II) is cobalt acetoacetic anilide.

16. The rubber composition as claimed in claim 8, wherein said bismaleimide compound is selected from the group consisting of phenylenebismaleimide, tolylenebismaleimide, ethylenebismaleimide and hexamethylenebismaleimide.

17. A tire comprising a carcass ply of steel cords having adhered thereto a rubber composition having excellent adhesion to steel cords comprising:

(a) 100 parts by weight of at least one rubber selected from the group consisting of natural rubber, synthetic rubber and a blend thereof;

(b) from about 0.01 to 1 part by weight of elemental cobalt contained in at least one cobalt oxyketone complex selected from the group consisting of compounds represented by formulae (I) and (II):

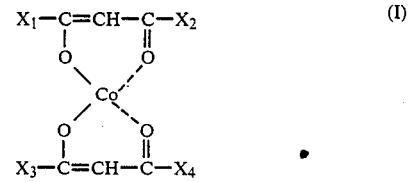

wherein $X_1$, $X_2$, $X_3$ and $X_4$, which may be the same or different, each represents an alkyl group containing 1 to 18 carbon atoms, a cycloalkyl group containing 5 to 12 carbon atoms, an aryl group containing 6 to 14 carbon atoms, an aryl group containing 6 to 14 carbon atoms substituted with an alkyl group containing 1 to 4 carbon atoms, an alkoxy group containing 1 to 18 carbon atoms, a cycloalkoxy group containing 5 to 12 carbon atoms, an aryloxy group containing 6 to 14 carbon atoms, an aryl group containing 6 to 14 carbon atoms substituted with an alkoxy group containing 1 to 4 carbon atoms, or a hydrocarbon group containing 2 to 18 carbon atoms and having at least one double bond, provided that $X_1$, $X_2$, $X_3$ and $X_4$ contain a total of at least 4 carbon atoms; and

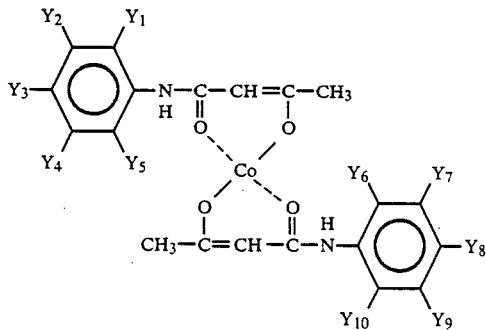

(II)

wherein $Y_1$, $Y_2$, $Y_3$, $Y_4$, $Y_5$, $Y_6$, $Y_7$, $Y_8$, $Y_9$ and $Y_{10}$, which may be the same or different, each represents hydrogen, an alkyl group containing 1 to 18 carbon atoms, a cycloalkyl group containing 5 to 12 carbon atoms, an aryl group containing 6 to 14 carbon atoms, an aryl group containing 6 to 14 carbon atoms substituted with an alkyl group containing 1 to 4 carbon atoms, an alkoxy group containing to 18 carbon atoms, a cycloalkoxy group containing 5 to 12 carbon atoms, an aryloxy group containing 6 to 14 carbon atoms, an aryl group containing 6 to 14 carbon atoms substituted with an alkoxy group containing 1 to carbon atoms, a halogen atom, or a hydrocarbon group containing 2 to 18 carbon atoms and having at least one double bond; and (c) from about 0.2 to 10 parts by weight of a bismaleimide compound represented by formula (III):

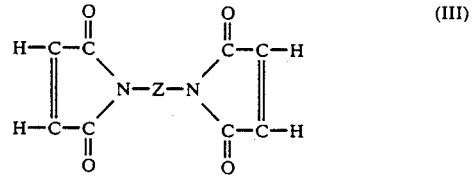

(III)

wherein Z represents a hydrocarbon group containing 2 to 10 carbon atoms.

* * * * *